(12) United States Patent
Sten et al.

(10) Patent No.: US 9,306,433 B2
(45) Date of Patent: Apr. 5, 2016

(54) DRIVE MODULE WITH SPRAY COOLING OF ELECTRIC MOTOR

(71) Applicant: eAAM Driveline Systems AB, Trollhättan (SE)

(72) Inventors: Erik J. Sten, Trollhättan (SE); Erik N. O. Matkaselka, Torslanda (SE)

(73) Assignee: e-AAM Driveline Systems AB, Trollhättan (SE)

( * ) Notice: Subject to any disclaimer, the term of this patent is extended or adjusted under 35 U.S.C. 154(b) by 477 days.

(21) Appl. No.: 13/798,593

(22) Filed: Mar. 13, 2013

(65) Prior Publication Data

US 2014/0265658 A1 Sep. 18, 2014

(51) Int. Cl.
H02K 9/193 (2006.01)
H02K 9/197 (2006.01)
H02K 9/19 (2006.01)
H02K 7/116 (2006.01)

(52) U.S. Cl.
CPC .................. *H02K 9/19* (2013.01); *H02K 9/193* (2013.01); *H02K 9/197* (2013.01); *H02K 7/116* (2013.01)

(58) Field of Classification Search
USPC ...................................... 310/54; 475/149, 150
See application file for complete search history.

(56) References Cited

U.S. PATENT DOCUMENTS

| | | | |
|---|---|---|---|
| 3,659,125 A | 4/1972 | Basel | |
| 4,600,848 A * | 7/1986 | Sutrina et al. | 310/54 |
| 5,160,864 A | 11/1992 | Saito | |
| 5,418,412 A | 5/1995 | Brucker | |
| 5,509,381 A * | 4/1996 | Fisher | 123/41.31 |
| 6,553,773 B2 * | 4/2003 | Laskaris | 62/64 |
| 6,727,609 B2 * | 4/2004 | Johnsen | 310/52 |
| 6,897,581 B2 * | 5/2005 | Doherty et al. | 310/52 |
| 7,462,963 B2 * | 12/2008 | Ishihara et al. | 310/58 |
| 2010/0077786 A1 * | 4/2010 | Siegenthaler et al. | 62/323.3 |
| 2011/0089777 A1 * | 4/2011 | Rivera et al. | 310/64 |
| 2012/0058855 A1 * | 3/2012 | Sten | 475/205 |
| 2012/0104884 A1 * | 5/2012 | Wagner et al. | 310/54 |
| 2014/0042841 A1 * | 2/2014 | Rippel et al. | 310/54 |

* cited by examiner

*Primary Examiner* — Burton Mullins
(74) *Attorney, Agent, or Firm* — Harness, Dickey & Pierce, P.L.C.

(57) ABSTRACT

A drive module with a housing, an electric motor, a coolant sump, an inlet pipe and a transmission and differential assembly that is driven by the electric motor to drive a pair of output members. The electric motor is coupled to the housing and has a stator, which is fixedly coupled to the housing, and a rotor that is rotatable within the stator. The rotor has a coolant passage, which extends parallel to a rotational axis of the rotor, and a nozzle passage that intersects the coolant passage and extends radially outwardly therefrom. The coolant sump is configured to hold a coolant fluid. The inlet pipe is in fluid communication with the coolant sump and is received into the coolant passage. The inlet pipe is configured to feed the coolant fluid from the coolant sump into the coolant passage. The coolant fluid is gravity fed into the inlet pipe.

9 Claims, 3 Drawing Sheets

DRIVE MODULE WITH SPRAY COOLING OF ELECTRIC MOTOR

FIELD

The present disclosure relates to a drive module with spray cooling of an electric motor.

BACKGROUND

This section provides background information related to the present disclosure which is not necessarily prior art.

Exemplary drive modules are disclosed in U.S. Patent Application Publication No. 2012/0058855. The drive modules can be employed as a means for propelling a vehicle and/or as a means for enhancing the control of the vehicle through torque vectoring. The drive modules typically include an electric motor that transmits power to a transmission and a differential assembly to drive a pair of vehicle wheels.

In some circumstances, the motor in such drive modules can generate a significant amount of heat. It is known to use water cooling systems and air cooling systems to reject heat from the motor. Water cooling systems are typically expensive and require additional space in the vehicle to package the components of the water cooling system. Air cooling systems are typically less expensive, but are typically less effective than a water cooling system. Moreover, air cooling systems may require ducting or another means for directing air onto the motor to provide a desired level of cooling. While such cooling systems are satisfactory for their intended purpose, there remains a need in the art for a drive module with improved cooling.

SUMMARY

This section provides a general summary of the disclosure, and is not a comprehensive disclosure of its full scope or all of its features.

In one form, the present teachings provide a drive module that includes a housing, an electric motor, a coolant sump, an inlet pipe, a pair of output members, and a transmission and differential assembly. The electric motor is coupled to the housing and has a stator, which is fixedly coupled to the housing, and a rotor that is rotatable within the stator. The rotor has a coolant passage, which extends parallel to a rotational axis of the rotor, and a nozzle passage that intersects the coolant passage and extends radially outwardly therefrom. The coolant sump that is configured to hold a coolant fluid. The inlet pipe is in fluid communication with the coolant sump and is received into the coolant passage. The inlet pipe is configured to feed the coolant fluid from the coolant sump into the coolant passage. The transmission and differential assembly is driven by the rotor of the electric motor to correspondingly drive the output members. The coolant fluid is gravity fed into the inlet pipe.

In another form, the present teachings provide a method of operating a drive module. The method includes: providing a drive module with a housing, an electric motor, a transmission, a differential assembly, and a cooling system, the electric motor having a stator and a rotor, the cooling system having a coolant sump, an inlet pipe and a coolant fluid, the inlet pipe coupling the coolant sump to the rotor in fluid communication; gravity feeding the coolant fluid from the coolant sump into the inlet pipe such that the coolant fluid is fed into the rotor; and centrifugally discharging the coolant fluid from the rotor and onto the stator to cool the motor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
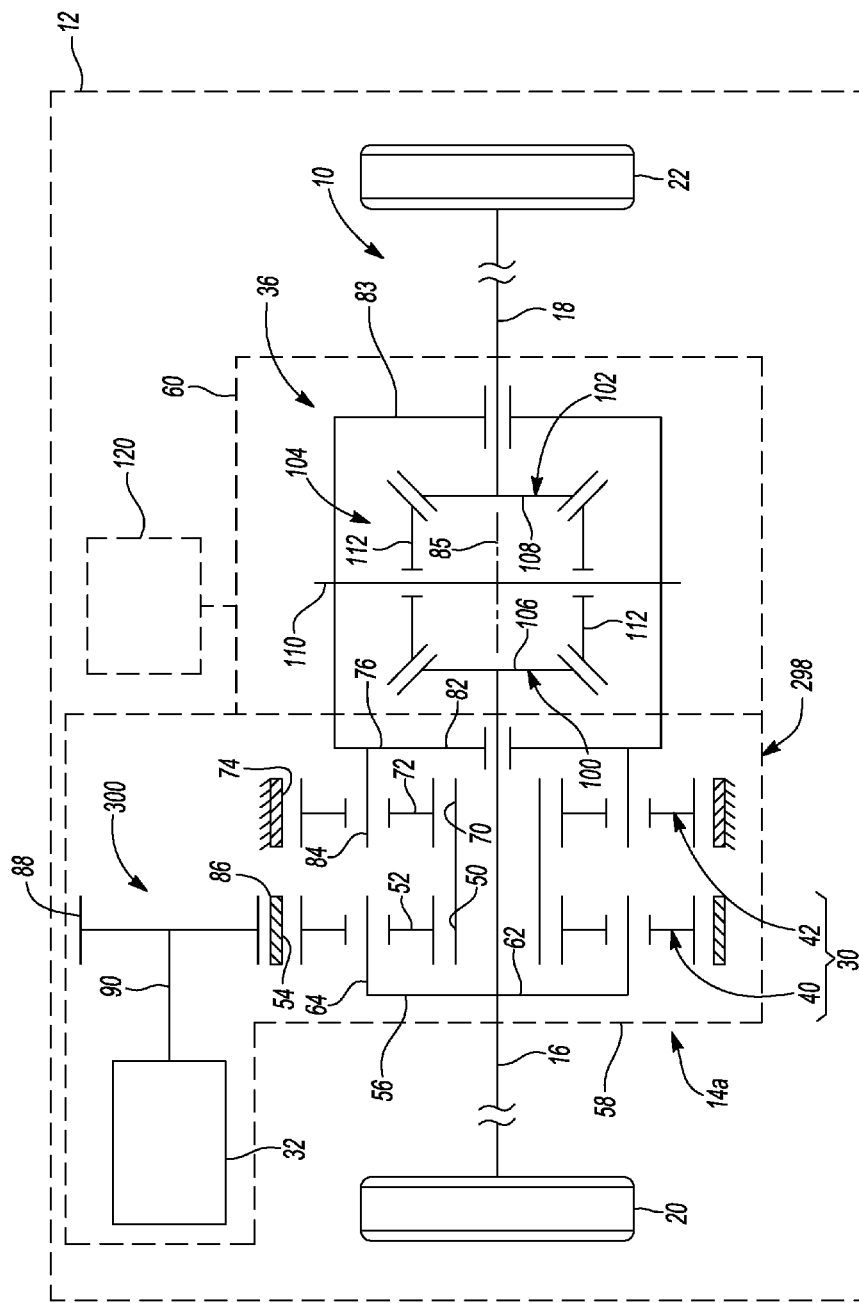
FIG. 1 is a schematic illustration of a first drive module constructed in accordance with the teachings of the present disclosure.
Figure 2:
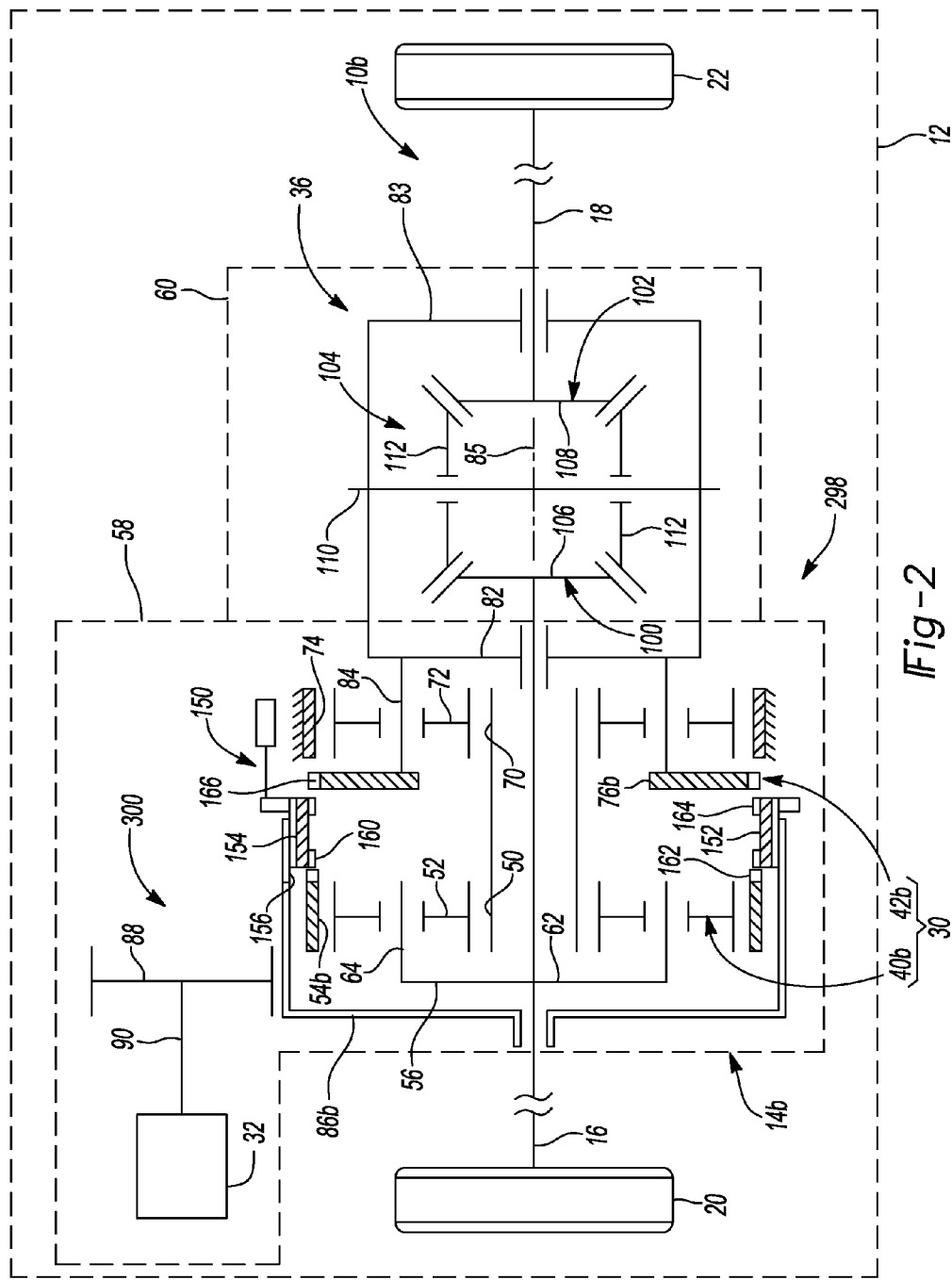
FIG. 2 is a schematic illustration of a second drive module constructed in accordance with the teachings of the present disclosure.

With reference to FIGS. 1 and 2, drive modules constructed in accordance with the teachings of the present disclosure are schematically depicted. The drive modules each include a cooling system 300 that is configured to cool an electric motor 32 during operation of the drive module. The drive module can otherwise be generally similar to any one of the drive modules disclosed in co-pending U.S. patent application Ser. No. 13/182,153 filed Jul. 13, 2011, the disclosure of which is incorporated by reference as if fully set forth in detail herein.

With reference to FIG. 1, a first exemplary drive module 10 is shown in operative association with a vehicle 12. The drive module 10 can include a housing 298, the electric motor 32, a transmission and differential assembly 14a, and first and second output members 16 and 18. The housing 298 can comprise a transmission housing 58 and a differential housing 60. The housing 298 can be configured to house the electric motor 32 and the transmission and differential assembly 14a. The electric motor 32 can be configured to drive the transmission and differential assembly 14a in one or more modes, such as a propulsion mode and/or a torque vectoring mode. The transmission and differential assembly 14a can be configured to output rotary power to the output members 16 and 18 and can include a transmission assembly 30 and a differential assembly 36.

The transmission assembly 30 can be co-axially mounted with respect to the first and second output members 16 and 18 and/or a differential assembly 36. The transmission assembly 30 can comprise a first planetary gear set 40 and a second planetary gear set 42. The first and second planetary gear sets 40 and 42 can have identical gear ratios and can be configured such that one or more of the components of the first planetary gear set 40 is/are interchangeable with associated component (s) of the second planetary gear set 42.

The first planetary gear set 40 can comprise a first sun gear 50, a plurality of first planet gears 52, a first ring gear 54, and a first planet carrier 56. The first sun gear 50 can be a generally hollow structure that can be mounted concentrically about the first output member 16. The first planet gears 52 can be spaced circumferentially about the first sun gear 50 such that teeth of the first planet gears 52 meshingly engage teeth of the first sun gear 50. Likewise, the first ring gear 54 can be disposed concentrically about the first planet gears 52 such that the teeth of the first planet gears 52 meshingly engage teeth on the first ring gear 54. The first ring gear 54 can be rotatably disposed in the transmission housing 58. The transmission housing 58 can be non-rotatably coupled to the differential housing 60, which houses the differential assembly 36. The first planet carrier 56 can include a first carrier body 62 and a plurality of first pins 64 that can be fixedly coupled to the first carrier body 62. The first carrier body 62 can be coupled to the first output member 16 such that the first carrier body 62 and the first output member 16 co-rotate. Any suitable means may be employed to couple the first carrier body 62 to the first output member 16, including welds and mating teeth or splines. Each of the first pins 64 can be received into an associated one of the first planet gears 52 and can support the associated one of the first planet gears 52 for rotation about a longitudinal axis of the first pin 64.

The second planetary gear set 42 can comprise a second sun gear 70, a plurality of second planet gears 72, a second ring gear 74, and a second planet carrier 76. The second sun gear 70 can be a generally hollow structure that can be mounted concentrically about the first output member 16. The second sun gear 70 can be non-rotatably coupled to the first sun gear 50 (e.g., the first and second sun gears 50 and 70 can be integrally and unitarily formed). The second planet gears 72 can be spaced circumferentially about the second sun gear 70 such that the teeth on the second planet gears meshingly engage teeth of the second sun gear 70. The second ring gear 74 can be disposed concentrically about the second planet gears 72 such that the teeth of the second planet gears 72 meshingly engage teeth on the second ring gear 74. The second ring gear 74 can be non-rotatably coupled to the transmission housing 58. The second planet carrier 76 can include a second carrier body 82 and a plurality of second pins 84 that can be fixedly coupled to the second carrier body 82. The second carrier body 82 can be coupled to a housing or differential carrier 83 of the differential assembly 36 such that the second carrier body 82 and the differential carrier 83 co-rotate. Each of the second pins 84 can be received into an associated one of the second planet gears 72 and can support the associated one of the second planet gears 72 for rotation about a longitudinal axis of the second pin 84.

The first and second planetary gear sets 40 and 42 can be co-aligned about a common longitudinal axis (i.e., an axis that can extend through the first and second sun gears 50 and 70) and can be offset from one another axially along the common longitudinal axis 85.

The electric motor 32 can be configured to drive an input member 86 of the first planetary gear set 40. In the example provided, the input of the first planetary gear set 40 is the first ring gear 54 and the input member 86 is coupled to the first ring gear 54 for common rotation. The input member 86 includes a plurality of teeth that meshingly engage teeth of a reduction gear 88 (i.e., an input of the transmission assembly 30) that is mounted on an output shaft 90 of the electric motor 32. The input member 86 can be a discrete component that can be non-rotatably coupled to the first ring gear 54, but in the example provided, the input member 86 and the first ring gear 54 are unitarily formed as a single discrete component.

In addition to the differential housing 60 and the differential carrier 83, the differential assembly 36 can include a means for transmitting rotary power from the differential carrier 83 to the first and second output members 16 and 18. The rotary power transmitting means can include a first differential output 100 and a second differential output 102. In the particular example provided, the rotary power transmitting means comprises a differential gear set 104 that is housed in the differential carrier 83 and which has a first side gear 106, a second side gear 108, a cross-pin 110 and a plurality of pinion gears 112. The first and second side gears 106 and 108 can be rotatably disposed about a rotational axis of the differential carrier 83 and can comprise the first and second differential outputs 100 and 102, respectively. The first output member 16 can be coupled to the first side gear 106 for common rotation, while the second output member 18 can be coupled to the second side gear 108 for common rotation. The cross-pin 110 can be mounted to the differential carrier 83 generally perpendicular to the rotational axis of the differential carrier 83. The pinion gears 112 can be rotatably mounted on the cross-pin 110 and meshingly engaged with the first and second side gears 106 and 108.

While the differential assembly 36 has been illustrated as employing bevel pinions and side gears, it will be appreciated that other types of differential mechanisms could be employed, including differential mechanisms that employ helical pinion and side gears or planetary gear sets.

Optionally, the differential assembly 36 may be coupled to a main or primary drive of the vehicle 12. In the particular example provided, the primary drive of the vehicle comprises an engine 120 that is employed to drive the differential assembly 36. In this regard, rotary power produced by the engine 120 can be transmitted in a conventional manner to the differential carrier 83 to drive the first and second output members 16 and 18 (i.e., via the differential carrier 83 and the differential gear set 104). In this way, the electric motor 32 may serve as a complement to the primary drive of the vehicle 12 such that when an auxiliary torque is simultaneously generated by the electric motor 32, the auxiliary torque will be superimposed to the first and second output torques induced by the primary drive as further explained in the following.

When the electric motor 32 is activated (i.e., when the output shaft 90 of the electric motor 32 rotates in the example provided), the electric motor 32, the reduction gear 88 and the input member 86 can cooperate to apply rotary power to the first ring gear 54 of the first planetary gear set 40. The rotary power received by the first ring gear 54 is transmitted via the first planet gears 52 and the first planet carrier 56 to the first output member 16, while an opposite reaction is applied to the first sun gear 50 such that the first sun gear 50 rotates in a direction that is opposite to the first planet carrier 56. Rotation of the first sun gear 50 causes corresponding rotation of the second sun gear 70 to thereby drive the second planet gears 72. Because the second ring gear 74 is rotationally fixed to the transmission housing 58, rotation of the second planet gears 72 causes rotation of the second planet carrier 76 in a direction that is opposite to the direction of rotation of the first planet carrier 56. Accordingly, the magnitude of the rotary power (i.e., torque) that is transmitted from the second planet carrier 76 to the differential carrier 83 (and through the differential assembly 36 to the second output member 18) is equal but opposite to the magnitude of the rotary power (i.e., torque) that is transmitted from the first planet carrier 56 to the first output member 16.

Thus, as a result, the torque induced by the electric motor 32 to the first and second output members 16 and 18, respectively, is counter-directed. Moreover, since the first and second planetary gear sets 40 and 42 are operably coupled via the differential assembly 36, the magnitude of the induced torque at the first and second output members 16 and 18 is substantially equal. For example, if a positively directed torque is transmitted to the first output member 16 (via rotation of the output shaft 90 of the electric motor 32 in a first rotational direction), an equal negative torque is transmitted to the second output member 18. Similarly, if a negatively directed torque is transmitted to the first output member 16 (via rotation of the output shaft 90 of the electric motor 32 in a second rotational direction opposite the first rotational direction), an equal positive torque is transmitted to the second output member 18. In other words, the transmission and differential assembly 14a may be employed to generate a torque difference between the first and second differential outputs 100 and 102, which is communicated to the left and the right wheels 20 and 22, respectively, through the first and second output members 16 and 18, respectively.

In situations where the electric motor 32 is activated when rotary power is transmitted from the primary drive (i.e., engine 120 in the example illustrated) to the differential assembly 36, the torque transmitted by the transmission and differential assembly 14a will act as an offset torque which is superposed to the input torque transmitted to the drive module 10 from the primary drive. Stated another way, the input torque from the primary drive is distributed via the differential assembly 36 such that a first drive torque is applied via the first differential output 100 to the first output member 16 and a second drive torque is applied via the second differential output 102 to the second output member 18, while a supplemental torque induced by the electric motor 32 is distributed via the transmission assembly 30 such that a first vectoring torque is applied to the first output member 16 and a second vectoring torque (which is equal and opposite to the first vectoring torque in the example provided) is applied to the second output member 18 (via the differential assembly 36). The net torque acting on the first output member 16 is the sum of the first drive torque and the first vectoring torque, while the net torque acting on the second output member 18 is the sum of the second drive torque and the second vectoring torque.

As an example, the transmission and differential assembly 14a may subtract a torque from the left wheel 20 and add a corresponding torque to the right wheel 22 when the motorized vehicle 12 turns left, and may subtract a torque from the right wheel 22 and add a corresponding torque to the left wheel 20 when the motorized vehicle 12 turns right to improve the turning behavior of the vehicle 12 and decrease its turning radius.

Those of skill in the art will appreciate that the configuration of the transmission assembly 30 causes the first and second sun gears 50 and 70 to experience the highest rotational velocity, while the first ring gear 54 rotates at a somewhat slower rotational velocity, and the first and second planet carriers 56 and 76 rotate at a rotational velocity that is slower than that of the first ring gear 54. In this way a favorable gear ratio, such as a gear ratio of about 1:1.5 to about 1:2.0, can be achieved between the first ring gear 54 and the first output member 16. As a result, the size of the gears of the transmission assembly 30 may be made small. For example, the diameter of the first and second planet gears 52 and 72 may be as small as about 30 mm. In this way, the size of the transmission assembly 30 may be small, and thereby the transmission and differential assembly 14a may be made compact and lightweight.

The electric motor 32 is intended to be activated (e.g., automatically or on an as-needed basis) when the vehicle 12 turns. During straight forward driving, the electric motor 32 is therefore non-activated to permit the vehicle 12 to be propelled in a forward direction by the engine 120. In such a situation, the differential assembly 36, which receives the input torque from the engine 120, transmits a substantially equal torque to the first output member 16 and the second output member 18. In turn, a substantially equal torque is transmitted to the first and second planetary carriers 56 and 76 which rotate with a substantially equal speed. As an effect, and due to the identical planetary gear sets 40 and 42, there will be no relative motion between the first and second ring gears 54 and 74, meaning that almost no effect or torque is transferred to the first and second ring gears 54 and 74. In other words, neither the first ring gear 54 nor the second ring gear 74 will rotate. In this way, the output shaft 90 of the electric motor 32 will not move and losses during straight forward driving are in this way minimized.

While the input member 86 has been illustrated and described as directly engaging the reduction gear 88, it will be appreciated that one or more reduction stages could be disposed between the input member 86 and the reduction gear 88 or that the input member 86 could be directly driven by the electric motor 32.

With reference to FIG. 2, another drive module constructed in accordance with the teachings of the present disclosure is generally indicated by reference numeral 10b. The drive module 10b can be generally similar to the drive module 10 of FIG. 1 except as noted herein. In this example, the drive module 10b comprises a transmission and differential assembly 14b that is selectively operable in a plurality of operational modes including a torque vectoring mode, a drive mode and a neutral mode. The transmission and differential assembly 14b can be structurally similar to the transmission and differential assembly 14a of FIG. 1, except that the input member 86b is rotatable relative to the first ring gear 54b and an actuator 150 is employed to control the operational state of the transmission and differential assembly 14b. The input member 86b can comprise a crown gear that can be rotatably mounted about the first output member 16 and the first planetary gear set 40b. The actuator 150 can include a shift sleeve 152 that can form the transmission input. The shift sleeve 152 can have a toothed exterior surface 154, which can be non-rotatably but axially slidably engaged to a matingly toothed interior surface 156 of the input member 86b, a set of first internal teeth 160, which can be matingly engaged to corresponding teeth 162 formed on the first ring gear 54b, and a set of second internal teeth 164 that can be matingly engaged to corresponding teeth 166 formed on the second planet carrier 76b.

In the torque vectoring mode, the shift sleeve 152 can be positioned in a first position to couple the input member 86b to the first ring gear 54b (via engagement of the set of first internal teeth 160 to the teeth 162 on the first ring gear 54b) such that the input member 86b, the shift sleeve 152 and the first ring gear 54b co-rotate. It will be appreciated that the set of second internal teeth 164 are disengaged from the teeth 166 on the second planet carrier 76b when the shift sleeve 152 is in the first position. Accordingly, it will be appreciated that operation of the transmission and differential assembly 14b in the torque vectoring mode is substantially similar to the operation of the transmission and differential assembly 14a (FIG. 1). In this regard, the electric motor 32 may be selectively activated to induce a torque difference between the first and second output members 16 and 18 as previously explained.

In the drive mode, the shift sleeve 152 can be positioned in a second position to couple the input member 86b to the second planet carrier 76b (via engagement of the set of second internal teeth 164 with the teeth 166 on the second planet carrier 76b) such that rotary power provided by the electric motor 32 is input to differential carrier 83 and applied to the first and second output members 16 and 18 via the differential assembly 36. It will be appreciated that the set of first internal teeth 160 on the shift sleeve 152 can be disengaged from the teeth 162 on the first ring gear 54b when the shift sleeve 152 is in the second position. It will also be appreciated that rotary power provided by the electric motor 32 when the transmission and differential assembly 14b is operated in the drive mode is employed for propulsive power to propel (or aid in propelling) the vehicle 12.

In the neutral mode, the shift sleeve 152 can uncouple the input member 86b from the first ring gear 54b and the second planet carrier 76b such that the input member 86b is decoupled from the first planetary gear set 40b, the second planetary gear set 42b, and the differential carrier 83. In the example provided, the shift sleeve 152 can be positioned in a third position between the first and second positions such that the sets of first and second internal teeth 160 and 164 are disposed axially between and disengaged from the teeth 162 on the first ring gear 54b and the teeth 166 on the second planet carrier 76b. Accordingly, placement of the shift sleeve 152 in the third position decouples the electric motor 32 from the first planetary gear set 40b, the second planetary gear set 42b and the differential carrier 83.

Figure 3:
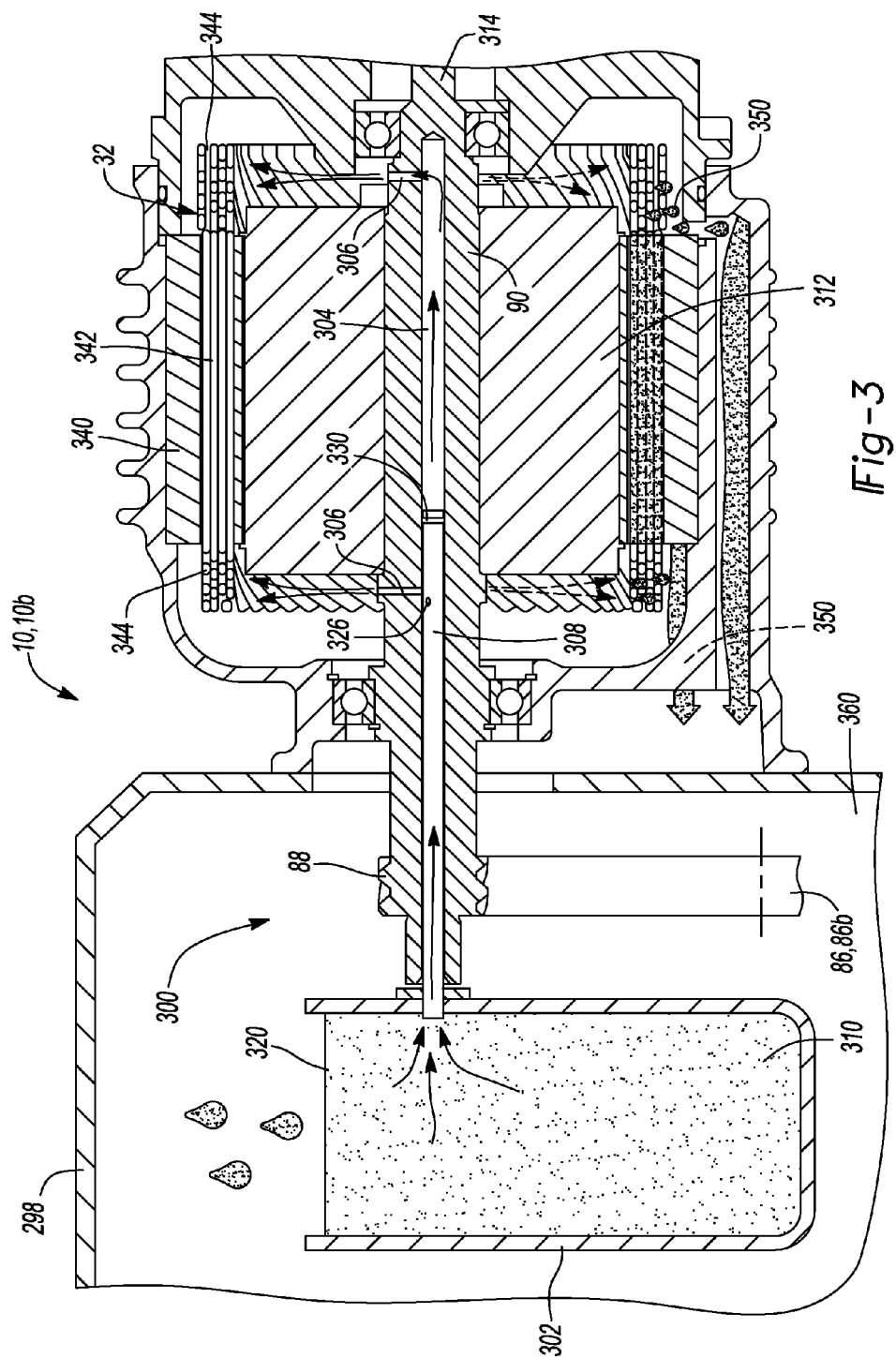
FIG. 3 is a sectional of a portion of the drive modules of FIGS. 1 and 2, illustrating a cooling system for cooling an electric motor in more detail.

With reference to FIG. 3, a portion of the drive modules 10 and 10b that includes the electric motor 32, the reduction gear 88 and the input member 86 or 86b is illustrated in conjunction with the cooling system 300. The cooling system 300 can include a coolant sump 302, a coolant passage 304, one or more coolant nozzle passages 306, and an inlet pipe 308. The coolant sump 302 can be defined by the housing 298 and can be configured to hold a suitable coolant fluid 310, such as an oil. The coolant passage 304 can be formed in the rotor 312 of the electric motor 32 parallel to a rotational axis 314 of the rotor 312. In the example provided, the coolant passage 304 is formed in the output shaft 90 and is coaxial with the rotational axis 314. Each nozzle passage 306 can intersect the coolant passage 304 and can extend radially outwardly therefrom. In the particular example provided, the nozzle passages 306 are wholly defined by the output shaft 90, but it will be appreciated that the nozzle passages 306 could be defined by a structure (e.g., conduit, nozzle structure) that is assembled to the output shaft 90. The inlet pipe 308 can be in fluid communication with the coolant sump 302 and can be received into the coolant passage 304. The inlet pipe 308 can be configured to feed coolant fluid 310 from the coolant sump 302 into the coolant passage 304. In this regard, the inlet pipe 308 can intersect the coolant sump 302 at a location below a coolant fluid level 320 so that the coolant fluid 310 in the coolant sump 302 is gravity fed through the inlet pipe 308 and into the coolant passage 304. The inlet pipe 308 can be non-rotatably coupled to a structure that forms the coolant sump 302 (i.e., the housing 298 in the particular example provided). If desired, one or more holes 326 can be formed through a tube wall that forms the inlet pipe 308. Also if desired, a bearing 330 can be coupled to an end of the inlet pipe 308 that is disposed opposite the coolant sump 302. In the particular example provided, the bearing 330 is a plain bearing.

The cooling system 300 can be employed to cool desired portions of the electric motor 32 during operation of the drive module 10 or 10b. In the particular example provided, the electric motor 32 includes a stator 340 having a plurality of windings 342 with winding ends 344 at first and second axial ends of the stator 340 and the cooling system 300 is configured to aid in cooling the winding ends 344. In this regard, rotation of the rotor 312 causes coolant fluid 310 in the rotor 312 to be centrifugally discharged (i.e., slung) from the nozzle passages 306. It will be appreciated that the nozzle passages 306 can be positioned in any desired manner so as to direct the coolant fluid 310 onto a desired portion of the electric motor 32. In the particular example provided, the cooling system 300 includes only two nozzle passages 306, and each of the nozzle passages 306 is configured to direct the coolant fluid 310 onto an associated set of the winding ends 344. However, the windings 342 could be coupled to the remainder of the stator 340 with an epoxy or molded into a thermally conductive polymer, and the nozzle passages 306 could be positioned in desired locations to cool other portions of the windings 342.

Coolant fluid 310 can drain down the sides of the stator 340 and can pass through one or more coolant drains 350 in the housing 298 into a gear lubrication sump 360. One or more of the plurality of gears of the transmission assembly 30, such as the input member 86 or 86b, can be configured to rotate in the coolant fluid 310 in the gear lubrication sump 360 and to sling the coolant fluid 310 (due to centrifugal force) such that a portion of the slung coolant fluid 310 is received into the coolant sump 302.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A drive module comprising:
   a housing;
   an electric motor coupled to the housing, the electric motor having a stator, which is fixedly coupled to the housing, and a rotor that is rotatable within the stator,
   a pair of output members; and
   a transmission and differential assembly driven by the rotor of the electric motor to correspondingly drive the output members; and
   a cooling system that includes:
      a coolant passage formed in the rotor, the coolant passage extending parallel to a rotational axis of the rotor;
      a nozzle passage formed in the rotor, the nozzle passage intersecting the coolant passage and extending radially outwardly therefrom;
      a coolant sump that is configured to hold a coolant fluid, the coolant comprising an oil; and
      an inlet pipe that is in fluid communication with the coolant sump and received into the coolant passage, the inlet pipe being configured to feed the coolant fluid from the coolant sump into the coolant passage;
   wherein the coolant fluid is gravity fed into the inlet pipe;
   wherein the housing comprises a coolant drain that permits the cooling fluid to drain from the stator into a gear lubrication sump; and
   wherein the transmission comprises a plurality of gears and wherein at least one of the plurality of gears is configured to rotate in the coolant fluid in the gear lubricant sump and to sling a portion of the coolant fluid into the coolant sump.

2. The drive module of claim 1, wherein the inlet pipe is non-rotatably coupled to a structure that forms the coolant sump.

3. The drive module of claim 1, wherein the electric motor comprises a plurality of windings having winding ends at first and second axial ends of the stator, and wherein a first one of the nozzle passages is configured to discharge the coolant fluid onto the winding ends at the first axial end of the stator, and wherein a second one of the nozzle passages is configured to discharge the coolant fluid onto the winding ends at the second axial end of the stator.

4. The drive module of claim 1, wherein the inlet pipe has a tube wall and wherein at least one hole is formed through the tube wall.

5. The drive module of claim 1, wherein a bearing is coupled to an end of the inlet pipe opposite the coolant sump.

6. The drive module of Claim 5, wherein the bearing is a plain bearing.

7. The drive module of claim 1, wherein the at least one of the plurality of gears comprises a ring gear.

8. The drive module of claim 1, wherein the coolant fluid is an oil.

9. A method of operating a drive module, the method comprising:
  providing a drive module with a housing, an electric motor, a transmission, a differential assembly, and a cooling system, the electric motor having a stator and a rotor, the cooling system having a coolant sump, an inlet pipe and a coolant fluid, the inlet pipe coupling the coolant sump to the rotor in fluid communication, the coolant fluid comprising an oil;
 gravity feeding the coolant fluid from the coolant SUMP into the inlet pipe such that the coolant fluid is fed into the rotor;
 centrifugally discharging the coolant fluid from the rotor and onto the stator to cool the motor;
 draining a portion of the coolant fluid from the stator into a gear lubrication sump; and
 rotating at least one element of the transmission through the coolant fluid in the gear lubrication sump to sling coolant fluid from the at least one element of the transmission into the coolant sump.

* * * * *